United States Patent
Zhou et al.

(10) Patent No.: US 6,692,663 B2
(45) Date of Patent: Feb. 17, 2004

(54) COMPOSITIONS PRODUCED BY SOLVENT EXCHANGE METHODS AND USES THEREOF

(75) Inventors: Qingye Zhou, Boxborough, MA (US); Jae Ryu, Lowell, MA (US); Dieter Freitag, Chelmsford, MA (US); Karen Mulford, Brighton, MA (US)

(73) Assignee: Elecon, Inc., Chelmsford, MA (US)

( * ) Notice: Subject to any disclaimer, the term of this patent is extended or adjusted under 35 U.S.C. 154(b) by 41 days.

(21) Appl. No.: 10/167,043

(22) Filed: Jun. 10, 2002

(65) Prior Publication Data

US 2003/0164477 A1 Sep. 4, 2003

Related U.S. Application Data

(63) Continuation-in-part of application No. 09/999,171, filed on Nov. 30, 2001.
(60) Provisional application No. 60/298,174, filed on Jun. 13, 2001, and provisional application No. 60/269,606, filed on Feb. 16, 2001.

(51) Int. Cl.[7] .............. H01B 1/12; H01B 1/20; C08G 75/00
(52) U.S. Cl. ............. 252/500; 528/373; 528/377; 252/301.32
(58) Field of Search ............. 252/500, 301.32; 528/373, 377, 378; 257/82; 362/800

(56) References Cited

U.S. PATENT DOCUMENTS

| | | | |
|---|---|---|---|
| 5,300,575 A | | 4/1994 | Jonas et al. |
| 5,403,467 A | * | 4/1995 | Jonas et al. ............. 205/125 |
| 5,618,469 A | | 4/1997 | Harlev et al. |
| 5,766,515 A | | 6/1998 | Jonas et al. |
| 5,998,014 A | * | 12/1999 | Muller et al. ............. 428/355 |
| 6,083,635 A | | 7/2000 | Jonas et al. |
| 6,084,040 A | | 7/2000 | Jonas et al. |

FOREIGN PATENT DOCUMENTS

EP 686662 7/2000

OTHER PUBLICATIONS

Groenendaal et, al. Poly (3,4–ethylendioxythiophene) and Its Derivatives: Past, Present, and Its Derivatives: Past, Present, and Future, Advanced Materials, 2000, pp. 481–494, vol. 12, No. 7.

Roncali, Synthetic Principles for Bandgap Control in Lenear II–Conjugated Systems, Chemical Reviews, 1997, pp. 173–205.

Kraft, Elektrolumineszeirende konjugierte Polymere—Polymere erstrahlen in neuem Licht, AUFSATZE, 1998, pp. 417–443.

Roncali, Electrogenerated functional conjugated polymers as advanced electrode material, Journal of Chemistry, 1999, pp. 1875–1893.

Roncall, Linear r–conjugated systems with tailored electric properties, Ann. Rep., 1999, pp. 47–88.

Sirringhaus, High–Resolution Inkjet Printing of All–Polymer Transistor Circuits, Science Magazine, Dec. 15, 2000, pp. 2123–2126, vol. 290.

(List continued on next page.)

*Primary Examiner*—Mark Kopec
(74) *Attorney, Agent, or Firm*—Raymond A. Miller; Pepper Hamilton LLP

(57) ABSTRACT

Disclosed are compositions formed by a method for exchanging the water in an optionally substituted polythiophene dispersion with a specific mixture of organic solvents. The resulting compositions exhibit improved electrical conductivity, optical transparency, environmental stability, excellent adhesion to a variety of substrates and processing characteristics. Also disclosed are methods for making and using such compositions.

49 Claims, 1 Drawing Sheet

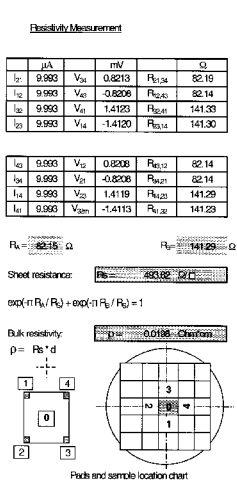

OTHER PUBLICATIONS

Sirrainghaus, Two–dimensional chargetransport in self–organized, high mobility conjucated polymers, Macmillan Magazine, Oct. 14, 1999, pp. 685–688, vol. 401.

Burroughes,J.H.et. al., New Semiconductor device physics in polymer diodes and transistros, Sep. 8, 1998, pp. 137–141, Nature vol. 335.

Shirakawa, E.J., et al., Synthesis of Electrically Conducting Organic Polymers: Halogen Derivatives of Polyacetylene, (CH), J.C.S.Chem, Comm, 1977, pp. 578–580.

A.J. Heeger, Polyaniline with Surfactant Counterions: Conducting Polymer Materials Which are Processible in the conducting form, Synthetic Metals, 55–57, 1993 pp. 3471–3482.

G. Kobmehl et al., Adv. Polym. Sci., 129, 1 (1996) Pub. Info. only.

Dagni, R. Chemistry and Engineering, Jan. 1, 2001, pp. 26–27.

Y.Cao, et. al., Conjugated Polymeric Materials: Opportunitiesin Electronics Optoelectronics and Molecular Electronics, NATO Advanced Study Institute, Series E.: Applied Sciences, J.Bredas and R.R. Chance, Eds, vol. 82 (1990) pp 171–193.

Fichou, D. Handbook of Oligio–and Polythiophenes, Wiley–VCH, New York (1999) Pub Info. only.

Skotheim, T. A., et. al., Handbook of Conducting Polymers, N.Y. NY (1998), LIDE, D., Handbook of Chemistry and Physics, CRC Press, 76th Edition, 1995–1996 Pub Info. only.

Cargill Dow, LLC, Ethyl Lactate Solvent, Applications Bulletin, Jul., 2001.

Bayer, AG, Product Literature edition 10/97; Inorganic Business Group D–51368, Leverkusen Germany.

* cited by examiner

Van der Pauw Hall Measurement Worksheet

Sample ID    QZ01-119 (4)        Sample # [ 161 ] Pos 0 ( See chart below )
Thickness if known (cm)    4.00E-05 cm        Dimensions    10.0mm x 10.0mm
Date:    03/04/02        Lab _____ Bay 8 _____ Operator    MS
Chemical treatment
Contact Metal___ Indium        Contact process_____
Comments    100 Deg. Anneal. 15/20 minutes Heat/Cooling. Clear P-type
Viscous behavior, No optimization
Thickness = 4.00E-05 cm        400 nm

Resistivity Measurement

|  | μA |  | mV |  | Ω |
|---|---|---|---|---|---|
| $I_{21}$ | 9.993 | $V_{34}$ | 0.8213 | $R_{21,34}$ | 82.19 |
| $I_{12}$ | 9.993 | $V_{43}$ | -0.8208 | $R_{12,43}$ | 82.14 |
| $I_{32}$ | 9.993 | $V_{41}$ | 1.4123 | $R_{32,41}$ | 141.33 |
| $I_{23}$ | 9.993 | $V_{14}$ | -1.4120 | $R_{23,14}$ | 141.30 |

| $I_{43}$ | 9.993 | $V_{12}$ | 0.8208 | $R_{43,12}$ | 82.14 |
|---|---|---|---|---|---|
| $I_{34}$ | 9.993 | $V_{21}$ | -0.8208 | $R_{34,21}$ | 82.14 |
| $I_{14}$ | 9.993 | $V_{23}$ | 1.4119 | $R_{14,23}$ | 141.29 |
| $I_{41}$ | 9.993 | $V_{32m}$ | -1.4113 | $R_{41,32}$ | 141.23 |

$R_A$ = 82.15 Ω        $R_B$ = 141.29 Ω

Sheet resistance:    $R_S$ = 493.82 Ω/□

$$\exp(-\pi R_A / R_S) + \exp(-\pi R_B / R_S) = 1$$

Bulk resistivity:    ρ = 0.0198 Ohm*cm
ρ = $R_S * d$

Hall Voltage Measurements (+)B Field (G)    870.0    Gauss

|  | μA |  | mV |
|---|---|---|---|
| $I_{13}$ | 9.993 | $V_{24P}$ | -0.5899 |
| $I_{31}$ | 9.993 | $V_{42P}$ | 0.5905 |
| $I_{42}$ | 9.993 | $V_{13P}$ | -0.5894 |
| $I_{24}$ | 9.993 | $V_{31P}$ | 0.5898 |

(-)B Field (G)    870.0    Gauss

|  | μA |  | mV |  |
|---|---|---|---|---|
| $I_{13}$ | 9.993 | $V_{24N}$ | -0.5902 | 0.0003 |
| $I_{31}$ | 9.993 | $V_{42N}$ | 0.5902 | 0.0003 |
| $I_{42}$ | 9.993 | $V_{13N}$ | -0.5896 | 0.0002 |
| $I_{24}$ | 9.993 | $V_{31N}$ | 0.5892 | 0.0006 |

$\Sigma V_I = V_C + V_D + V_E + V_F$ $\Sigma V_i$ = 0.0014 mV

Sheet carrier density:
$n_s = 8 \times 10^8 \, |B| / q \, |\Sigma V_i|$ $n_s$ = 3.1E+15 cm$^{-2}$ Bulk carrier density:
$n = n_s / d$ $n$ = 7.75E+19 cm$^{-3}$ Hall mobility:
$\mu = 1 / q \, n_s \, R_S$ $\mu$ = 4.08 cm$^2$V$^{-1}$s$^{-1}$

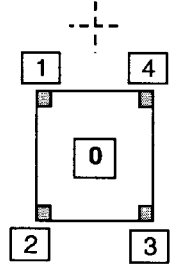
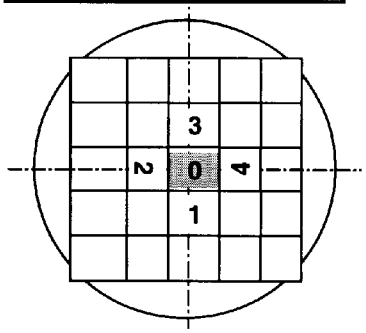

Pads and sample location chart

Figure 1 ial Application No. 60/298,174 as filed on Jun. 13, 2001, and
COMPOSITIONS PRODUCED BY SOLVENT EXCHANGE METHODS AND USES THEREOF

CROSS REFERENCE TO RELATED APPLICATIONS

The present application is a Continuation-In-Part of U.S. patent application Ser. No. 09/999,171 filed on Nov. 30, 2001 which application claims benefit to U.S. Provisional Application No. 60/298,174 as filed on Jun. 13, 2001, and U.S. Provisional Application No. 60/269,606 as filed on Feb. 16, 2001. The disclosures of the U.S. Ser. Nos. 09/999,171, 60/298,174 and 60/269,606 applications are each incorporated herein by reference.

TECHNICAL FIELD

The present disclosure generally relates to conductive polymer compositions produced by a solvent exchange method, and more specifically to conductive polymer compositions produced by a method that involves the exchange of the water in a polythiophene dispersion with a specific mixture of organic solvents. The present disclosure also relates to methods for producing such compositions. This disclosure further pertains to the application of these compositions to fabricate a variety of articles, such as coatings, and to making and using the same in the fabrication of electronic and opto-electronic devices.

DESCRIPTION OF THE RELATED ART

Conductive polymers (CPs) have received considerable attention in recent years due to their potential applications in a variety of electronic devices. The realization that organic polymeric materials could be made to exhibit electrical conductivity by doping was first discovered in 1977 [H. Shirakawa, E. J. Louis, A. G. MacDarimid, C. K. Chang and A. J. Heeger, J. Chem. Soc. Chem. Comm. 579 (1977)]. This discovery was considered such a breakthrough that the Nobel Prize in Chemistry was awarded to these researchers (McDiarmid, Heeger and Shirakawa) in 2000 for this work. CPs are presently used in commercial products as anti-static coatings on plastics such as photographic film and electronic packaging materials. Other applications include solid electrode capacitors, through-hole plating of printed circuit boards, coatings for cathode ray tubes (to prevent dust attraction), hole injecting layers on indium tin oxide (ITO) substrates for electroluminescent devices, and sensors. Future applications such as an ITO replacement leading to completely flexible, organic electronic devices will require improvement in conductivity without sacrificing other properties such as optical transparency.

A variety of conductive polymers have been prepared and characterized, and several are commercially available such as Baytron® P from Bayer and Panipol® from Uniax. Of the different CP families, [i.e. polyacetylenes, polyphenylenes, poly(p-phenylenevinylene)s, polypyrroles, polyanilines, and polythiophenes] polythiophenes are arguably the most stable-thermally and electronically [("Handbook of Oligio- and Polythiophenes", D. Fichou, Editor, Wiley-VCH, New York (1999), J. Roncali, Chem. Rev., 97, 173 (1997), A. Kraft, A. C. Grimsdale and A. B. Holmes, Angew. Chem., 110, 416 (1998), J. Roncali, J. Mater. Chem., 9, 1875 (1999), J. Roncali, Annu. Rep. Prog. Chem. Sec. C., 95, 47 (1999), A. J. Heeger, Synth. Met., 55–57, 3471 (1993) and G. Kobmehl and G. Schopf, Adv. Polym. Sci., 129, 1 (1996)]. The Baytron® P product is a poly 3,4-ethylenedioxythiophene/polystyrene sulfonate (PEDOT/PSS) composition available as an aqueous dispersion containing ~1.3% solids. This aqueous dispersion is typically used to prepare coatings on various substrates. Baytron® P coatings exhibit no change in conductivity after 1000 hours in air at 100° C. and can survive intact at temperatures as high as 200° C., albeit for shorter exposure periods. It is prepared from 3,4-ethylenedioxythiophene (EDT) in aqueous or predominately aqueous media in the presence of polystyrenesulfonic acid (PSS, dopant) using an oxidant such as iron trichloride [L. B. Groenendaal, F. Jonas, D. Freitag, H. Pielartzik and J. R. Reynolds, Adv. Mater., 12(7), 481 (2000)]. Coatings of Baytron® P have been reported to exhibit a wide range of surface resistance, depending upon thickness. It is well known for Baytron® P, as well as other CP based coatings, that the surface conductivity will increase with increasing coating thickness while the optical transmission will decrease. In most coating applications, the coatings must exhibit a specific combination of electrical conductivity, optical transparency and environmental stability (i.e. stability to moisture and oxygen) to be useful. The coating must exhibit good adhesion to the substrate as well. The appropriate balance or combination of these properties is of critical importance; thus, a means for improving this combination of properties would represent a significant advancement and enable new applications for these materials.

One approach to improve the electrical conductivity of polythiophenes is by the use of organic additives. It has been shown that certain additives, when mixed with Baytron® P aqueous dispersion and subsequently used to make a coatings, can produce an increase in the electrical conductivity (i.e. decrease in surface resistivity), however a high temperature treatment (~200° C.) is also required [Jonas et al, U.S. Pat. No. 5,766,515, (1998) to Bayer AG]. The high temperature treatment is a major disadvantage since certain substrates cannot tolerate this step. No explanation of the mechanism associated with conductivity enhancement is offered; thus, it is impossible to elucidate what additives may bring about this increase in electrical conductivity.

Another method has involved a solvent exchange process in which most or all of the water present in a Baytron®P aqueous dispersion is exchanged with an organic solvent (see U.S. Ser. No. 09/999,171; 60/298,174 and 60/269,606). Employing the solvent exchange method also brings about a fundamental change to the material that results in significant improvement in the combination of electrical conductivity, optical transparency environmental stability and adhesion characteristics to a variety of substrates. Consequently, this method enables the solvent exchanged product to meet specifications for a variety of applications that the aqueous based precursor cannot meet.

Surface resistance of CP based coatings is typically measured using a four-point probe device. Certain other measurements must also be performed, such as coating thickness, in order to calculate volume resistivity. The volume resistivity is calculated using the following equation:

Volume resistivity=$(\pi/\ln 2)(k)(t)$(surface resistance in ohm/square)

Wherein "t" is the coating thickness, measured in centimeters (cm), "k" is the geometrical correction factor, and "ln2" is the natural log of 2. The constant k is related to the coating thickness, probe spacing and sample size. Due to the variables associated with these measurements, quantitative comparison between measurements of the volume resistivity of coatings performed using different devices and different operators can be problematic.

Organic polymers that are intrinsically conductive typically contain sp² hybridized carbon atoms that have (or can be adapted to have) delocalized electrons for storing and communicating electronic charge. Some polymers are thought to have conductivities neighboring those traditional silicon-based and metallic conductors. These and other performance characteristics make such conductive polymers desirable for a wide range of applications. See Burroughes, J. H. et al. (1986) *Nature* 335:137; Sirringhaus, H. et al. (2000) *Science*, 290, 2123; Sirringhaus, H. et al. (1999) *Nature* 401: 2; and references cited therein, for example.

There is recognition that many conductive polymers can be used to coat a wide range of synthetic or natural articles such as those made from glass, plastic, wood and fibers to provide an electrostatic or anti-static coating. Typical coatings can be applied as sprays, powders and the like using recognized coating or printing processes.

However, there is increasing understanding that many prior conductive polymers are not useful for all intended applications. For example, many of such polymers are not sufficiently conductive or transparent for many applications. In particular, many suffer from unacceptable conductivity, poor stability, and difficult processing requirements. Other shortcomings have been reported. See e.g, the U.S. Pat. Nos. 6,084,040 and 6,083,635. Efforts have focused on improving properties of conductive polymers such as solubility or conductivity. However, for many applications, having an improvement in only one property, such as electrical conductivity, is not sufficient for the material to be useful as a coating or as a component in an electrical or opto-electronic device. Today's applications for conductive polymers demand that the materials have specific combinations of properties that are often difficult to achieve in a single material. The properties of interest include, but are not limited to electrical conductivity, processing characteristics, optical transparency, adhesion to desired substrate, environmental stability, thermal stability and acceptable cost. Poly 3,4-ethylenedioxythiophene (commercially available as Baytron® P aqueous dispersion) has been reported to offer good conductivity, transparency, stability, hydrolysis resistance and processing characteristics. See Bayer AG product literature (Edition 10/97; Order No. A1 5593) Inorganics Business Group D-51368, Leverkusen, Germany. Other Baytron® formulations have been reported for use in specific applications. Illustrative formulations (P type) include CPUD2, CPP103T, CPP105T, CPP116.6, CPP134.18, CP135, CPP 4531 I, CPP 4531 E3 and CPG 130.6. Further information relating to using Baytron® formulations can be obtained from the Bayer Corporation, 100 Bayer Rd. Pittsburgh, Pa. 15205-9741. See also the Bayer Corporation website at bayerus.com the disclosure of which is incorporated by reference.

All commercially available and known Baytron® formulations are dispersions in aqueous or predominately aqueous media. In the patent literature relating to Baytron®, the claims all pertain to an aqueous dispersions or predominately aqueous dispersions (for example see U.S. Pat. Nos. 5,300,575, 5,766,515 and 6,083,635. No PEDOT/PSS formulations have been disclosed in the art which are dispersed or solvated in a substantially organic solvent system, nor has a method of preparing such a formulation been previously disclosed. Thus, in all applications using or contemplating the use of Baytron® P prior to these disclosures, it was assumed that the desired article would have to be fabricated from a predominately aqueous based dispersion. There are many known applications wherein Baytron® P would be useful if not for the water present and if the combination of conductivity, transparency, adhesion and environmental stability could be improved.

Flexible electronic device "writing" or "printing" has attracted much recent attention. An example of such a technique involves dispersing an aqueous and conductive thiophene preparation with an ink-jet printer. Typically, poly(3,4-ethylenedioxythiophene) doped with polystyrene sulfonic acid (PEDOT/PSS) is employed. See generally Dagni, R. in *Chemistry and Engineering*, Jan. 1, 2001, pp. 26–27 as well as references cited therein.

However, these writing or printing procedures have suffered for want of an effective and reproducible means of replacing water with one or more organic solvent(s).

There is recognition that many electrical devices such as thin film transistors (TFTs) and electro-optic devices, such as light emitting diodes (LED's), particularly organic light emitting diodes (OLED's), touch screen displays, smart windows, back lights for displays and photovoltaic cells, require substrates coated with an electrically conductive material that has high optical transparency, good adhesion to the substrate and ideally it can be applied in a one-step and continuous process. Typically these coated substrates function as electrodes, but they can perform other functions as well such as a hole injecting material. Coatings derived from Baytron® P aqueous dispersions have been tested in many of the aforementioned devices, however, significant technical problems were encountered, which could be traced back to water present in the dispersion of Baytron® P. Typically, the technical problems associated with prior Baytron® P coatings included unacceptable adhesion to the substrate, unacceptable environmental stability and insufficient optical transparency.

Presently, transparent electrodes in electro-optic devices are made of indium doped tin oxide (ITO) coated glass substrates. ITO/glass transparent electrodes are not flexible and the ITO coating is applied in a complex, expensive, batch oriented vacuum deposition process. ITO films are brittle and difficult to prepare and manipulate, particularly when used on plastics or large area substrates or flexible substrates. See generally Y. Cao, et al. in *Conjugated Polymeric Materials: Opportunities in Electronics, Optoelectronics and Molecular Electronics*, NATO Advanced Study Institute, Series E: Applied Sciences, J. L. Bredas and R. R. Chance, Eds., Vol. 82, Kluwer Academic, Holland (1990). See also U.S. Pat. No. 5,618,469 and EPO Pat. No. 686,662.

Thus, there is a need for a material that could replace ITO in some applications that could be processed in a continuous fashion. One such method is roll-to-roll coating of a continuous plastic web such as polyethylene terephthalate wherein the processing speeds could be dramatically increased and the cost of the product would decrease. Unfortunately, Baytron® P aqueous dispersions have failed to meet expectations in this application due to processing problems and unacceptable combination of conductivity, transparency, adhesion and environmental stability in the final coated plastic product.

Accordingly, there is a need for a method for producing organic solvent based conducting polymer compositions that offer an improved combination of properties such as processing characteristics, electrical conductivity, optical transparency, environmental stability and adhesion to a variety of substrates.

It is an objective of the present disclosure to provide a method for exchanging the water in an aqueous conductive polymer mixture with a specific mixture of organic solvents to produce organic solvent based conducting polymer compositions. Another objective of the present disclosure is to provide coatings from these compositions that, compared to coatings derived from the aqueous conductive polymer composition, exhibit a significant improvement in electrical conductivity, optical transparency, environmental stability and adhesion to glass and plastic substrates. Another objective of the present application is to apply the compositions and coated articles of the invention in applications and devices to provide improved performance.

SUMMARY OF THE INVENTION

The present disclosure relates to a solvent exchange method wherein water present in a commercially available Baytron® P aqueous dispersion is exchanged for a specific mixture of organic solvents. The resulting organic dispersion, comprising a conducting polymer dispersed in an organic solvent system, is dispersed in a mixture of organic solvents exhibits improvements in the following combination of properties, electrical conductivity, optical transparency, environmental stability, adhesion to a variety of substrates and processing characteristics. These conducting polymer compositions are useful for preparing coatings on a variety of substrates. They provide improved performance when used as coatings, layers or subcomponents in a variety of electronic and opto-electronic devices.

BRIEF DESCRIPTION OF THE DRAWINGS

FIG. 1 is a van der Pauw worksheet which presents the results of a van der Pauw/Hall measurement of a coating of the invention.

DETAILED DESCRIPTION OF THE EXEMPLARY EMBODIMENTS

Disclosed herein is a method for replacing or exchanging some or all of the water in polythiophene/anion aqueous dispersions or solutions. The preferred polythiophene/anion aqueous dispersions are polythiophene/polystyrene sulfonate dispersions. More preferable is the poly 3,4-ethylenedioxythiophene/polystyrene sulfonate (PEDOT/PSS) aqueous dispersion known commercially as Baytron® P. in the application of the method disclosed herein, the water is exchanged for a combination of two or more organic solvents. The use of a specific mixture of at least two organic solvents, especially specific mixtures of particularly preferred solvents, gives rise to an outstanding combination of properties that enable the resulting formulation to be used in coating applications that similar materials cannot perform in. The method when employed with a specific mixture of organic solvents further effects a fundamental change to the starting material such that the product exhibits an improved combination of properties. This improved combination of properties (relative to the precursor aqueous based dispersion or solvent exchanged material using only one solvent) includes increased electrical conductivity, higher optical transparency, stronger adhesion to glass and plastics, better stability of properties upon exposure to air and humidity and processability from an organic based media. These improvements enable new applications and render this product useful in applications that the precursor aqueous based material or solvent exchanged formulations using only one organic solvent cannot perform in. This method enables a material that when used as components in devices such as thin film transistors (TFT's), organic light emitting diodes (OLED's), touch screen displays, smart windows, or other electronic or opto-electronic devices, provides improved performance. The terms "replaced", "solvent exchange", "solvent exchanged" or like words or phrases refer to the replacement of some or all of the water associated with the polythiophene mixture with a specific mixture of two or more organic solvents by the method described herein. Preferably, the replacement of the water is at least about 30% (w/v) complete, more preferably at least about 50% (w/v), even more preferably at least about 90% (w/v) complete, most preferably at least about 99% (w/v) complete with respect to the total volume of water originally present in the dispersion. As mentioned, it is an object of the present disclosure to reduce the amount of water present in the polythiophene mixture sufficient to replace at least some of that water and sometimes essentially all of the water with a desired volume of the exchange solvent combination. For many applications, substantially complete substitution of the desired solvent combination for the water in the mixture will be preferred.

The present invention provides methods which are compatible with a wide range of polythiophene/anion aqueous dispersions or solutions. Preferred polythiophene/anion dispersing are cationically charged polydioxythiophenes represented by the following Formula (I):

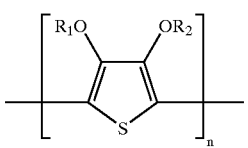

I wherein R1 and R2 each independently represent hydrogen or an optionally substituted C1–C6 alkyl group, or together form an optionally substituted C1–C6 radical, preferably a methylene radical which is optionally substituted by lower alkyl groups, an ethylene-1,2 radical optionally substituted by C1–C12 lower alkyl or phenyl groups, or an optionally substituted cyclohexylene-1,2 radical, n is >1, preferably about 2 to about 10,000, with between from about 5 to about 5000 being preferred for many applications. By the term "optionally substituted" is meant substitution with hydrogen, substituted or unsubstituted (C1–C18)-alkyl, preferably (C1–C10)-, in particular (C1–C6)-alkyl, (C2–C12)-alkenyl, preferably (C2–C8)-alkenyl, (C3–C7)-cycloalkyl, preferably cyclopentyl or cyclohexyl, (C7–C15)-aralkyl, preferably phenyl-(C1–C4)-alkyl, (C6–C10)-aryl, preferably phenyl or naphthyl, (C1–C18)-alkyloxy, preferably (C1–C110)-alkyloxy, for example methoxy, ethoxy, n- or iso-propoxy, or (C2–C18)-alkyloxy ester. Exemplary substitution groups include halogen, particularly chlorine, fluorine and bromine; lower alkyl, alkenyl, alkynyl, or alkoxy having 1 to 6 carbons, hydroxy, keto, allyl, and sulphonate, for example.

More specific examples of polydioxythiophenes have been reported in U.S. Pat. Nos. 5,766,515, 6,083,835, 5,300,575, 6,157,479, EP-A 440 957, EP-A 339,340; the disclosures of which are incorporated herein by reference. Particular polythiophenes of interest may, but do not necessarily include, one or more organic compounds containing dihydroxy or polyhydroxy, and/or carboxyl groups or amide groups e.g., lactam groups are N-methylpyrrolidone, pyrrolidone, caprolactam, N-methylcaprolactam, N-octylpyrrolidone. In embodiments in which such organic compounds are desired, the polythiophenes will further include sugar and sugar derivatives such as sucrose, glucose, fructose, lactose; sugar alcohols such as sorbitol, mannitol; furan derivatives such as 2-furancarboxylic acid, 3-furancarboxylic acid; alcohols such as ethylene glycol, glycerol, di- or triethylene glycol. See the U.S. Pat. No. 6,083,635, for example.

In many embodiments of this disclosure, the cationically charged polydioxythiophenes represented by I above are each associated with one or more suitable anion or polyanion. Preferred polyanions are the anions of polymeric carboxylic acids such as polyacrylic acids, polymethacrylic acids or polymaleic acids or of polymeric sulphonic acids such as polystyrenesulphonic acids and polyvinylsulphonic acids. These polycarboxylic and polysulphonic acids can also be copolymers of vinylcarboxylic and vinylsulphonic acids with other polymerizable monomers such as acrylic esters and styrene. The anion of polystyrenesulphonic acid is particularly preferred as polyanion in most embodiments of this disclosure.

The molecular weight of the polyacids providing the polyanions is preferably from 1000 to 2,000,000, more preferably from 2000 to 500,000. The polyacids or their alkali metal salts are commercially available, e.g. polystyrenesulphonic acids and polyacrylic acids, or else can be prepared by known methods. Other suitable polyanions include mixtures of alkali metal salts of polyacids and corresponding amounts of monoacids. See the U.S. Pat. No. 6,157,479 and references cited therein.

Additional preferred polythiophenes (I) include those in which R1 and R2 each independently represent C1–C4 alkyl or together form a C1–C4 radical. Preferred polythiophenes include poly-3,4-alkylene dioxythiophene, preferably poly-3,4-ethylene dioxythiophene. See also U.S. Pat. Nos. 5,294,372 and 5,066,731 for disclosure relating to other preferred thiophenes including mono- and polydioxythiophenes.

More preferred polydioxythiophenes for use herein are Baytron® P formulations (Bayer Corporation, 100 Bayer Rd. Pittsburgh, Pa. 15205-9741). Particularly preferred P type formulations include CPUD2, CPP103T, CPP105T, CPP116.6, CPP134.18, CP135, CPP 4531 I, CPP 4531 E3 and CPG 130.6. These formulations typically consist of poly-3,4-ethylene dioxythiophene/polystyrenesulphonic acid at a concentration about 1.3% and water. Other components, such as wetting agents, coupling agents, binders, dispersions and the like, may also be present in these formulations.

The following patents contain additional examples of suitable substituted or unsubstituted thiophene-containing polymers: U.S. Pat. Nos. 4,731,408; 4,959,430; 4,987,042; 5,035,926; 5,300,575; 5,312,681; 5,354,613; 5,370,981; 5,372,924; 5,391,472; 5,403,467; 5,443,944; 5,463,056; 5,575,898; and 5,747,412; the disclosures of which are each incorporated herein by reference.

As discussed, the invention is fully compatible with use of a wide array of solvent combinations. Generally, choice of an exchange solvent combination will be guided by recognized parameters including intended use for the converted (solvent exchanged) polythiophene. Further, solvent specific mixtures for performing the exchange will impart a certain combination of properties into the exchanged material that will dictate their selection. A more specific example of such a solvent combination typically contains at least one that is stable (i.e., does not degrade) to at least about 100° C. at standard temperature and pressure (STP). A preferred solvent boiling point is between from about 100° C. to about 250° C. at STP. Additionally, preferred solvents can be fully or partially soluble in water or water insoluble as needed. By the term "solvent combination" or like phrase is meant at least two mutually miscible solvents, preferably two, three or four of such solvents.

A wide variety of organic solvent mixtures are suitable for use in the solvent exchange methods of the invention. Examples of suitable solvents include mixtures of nitriles, ketones, ketals, carbonates, sugars, anhydrides, lactones, lactams, aminocarbonic acids, phenols, lower alkyl acetamides, lower alcohols including diols and triols, pyrrolidones, lower alkyl pyrrolidones, higher alkyl pyrrolidones, lower alkyl sulfoxides. A preferred lower alcohol is glycol or glycerin. Suitable lower alkyl sulfoxides include dimethylsulfoxide (DMSO). Particularly preferred solvent mixtures for use in many embodiments of the present disclosure include mixtures of two or more solvents selected from dimethylacetamide (DMAC), N-methylpyrrolidone (NMP) and ethylene glycol.

By the term "lower alkyl" is meant between from about 1 to 20 carbon atoms (branched or straight chain), preferably about 1 to about 10 of such carbon atoms, more preferably about 1 to about 4 of such carbon atoms.

More particular solvents and co-solvents for use herein will vary e.g., according to intended use. Example of such co-solvents and solvents include, but are not limited to, acetonitrile, benzonitrile, lower alkyl cyanoacetates, preferably methylcyanoacetate; halogenated methanes, preferably dichloromethane; diethyl ether, lower alkoxy ethanes, preferably dimethoxyethane; N,N-dimethylformamide, nitrobenzene, nitromethane, propionitrile, and propylene carbonate.

By the term "lower alkoxy" is meant alkoxy groups having from about 1 to about 10 carbon atoms, preferably from about 1 to about 6 carbon atoms including particularly preferred lower alkoxy groups such as methoxy, ethoxy, propoxy, isopropoxy, butyoxy; preferably methoxy. One preferred halogenated methane is partially or fully chlorinated or brominated e.g., dichloromethane and dibromomethane.

One or more of the foregoing preferred solvents may be combined to provide a solvent combination. A most preferred mixture of organic solvents is a mixture of ethylene glycol (EG) and NMP in any ratio. An illustrative highly preferred specific solvent combination is a mixture of EG and NMP comprising a 80:20 (v/v) mixture of those two solvents. Choice of a particular solvent combination will be guided by intended application of the converted polythiophene and the effect, if any, that the solvent combination has on the properties of the products produced from the solvent exchanged product.

As mentioned previously, the invention is flexible and can be performed by use of one or a combination of strategies. A preferred practice of the invention involves obtaining a suitable solvent combination and adding that to a vessel. Typically, the exchange solvent combination is heated in the vessel to a temperature of between from about 100° C. to about 250° C. In most embodiments, the vessel conditions further include exposing the solvent combination to a pressure of about 14.7 pounds per square inch (psi), although greater or less pressures may be more suitable for other applications. Preferably the vessel pressure is in the range of about less than 0.1 psi (near vacuum) to about 100 psi. More preferably the vessel pressure is from about less than 0.1 psi (near vacuum) to about 14.7 psi. The most preferred pressure is near ambient (14.7 psi). Subsequently, about 1 part of the mixture comprising the optionally substituted polythiophene/anion dispersion to at least about 1 part heated solvent per minute. Preferably, the addition step further includes adding about 1 part of the mixture to between from about 1 to about 10,000,000 parts heated solvent per minute, more preferably about 1.5 to about 100 parts of the heated solvent per minute. Preferred contact between the heated solvent mixture (larger volume) and the aqueous dispersion of the conductive polymer (smaller volume) transfers heat quickly into the aqueous dispersion thereby releasing water vapor from the dispersion. While not wishing to be bound by theory, the larger volume of the solvent mixture (relative to the volume of the aqueous dispersion) facilitates heat transfer to the dispersion and production of water vapor.

In a preferred embodiment, it is helpful to remove water vapor from the mixture such as by condensation or distillation into a separate vessel. Preferably, a chamber or trap is used to catch and retain the condensed water vapor. The trap can be configured with a cooling apparatus such as a cooling condenser to assist condensation of the water vapor if desired. In embodiments in which the trap is used, it is possible to measure the amount of water collected, thereby allowing quantification of the quantity of water vapor captured from the mixture entering the vessel. This feature provides many advantages, such as enabling the user to monitor the amount of water removed from the system as the solvent exchange process occurs. Moreover, the user can control the duration and extent of water solvent removal, for example, by adjusting the heat of the exchange solvent combination and/or flow of the mixture into the reaction vessel. Thus, the user can readily quantify solvent replacement by simple inspection of the water collected in the trap. Alternatively, the end-point of the exchange process can be determined by monitoring the temperature in the reaction vessel. The end-point temperature will vary depending upon the solvent mixture as well as the pressure used. For example, if the solvent specific mixture is comprised of 80% ethylene glycol and 20% N-methylpyrrolidinone operating at ambient pressure, then the end is reached when the temperature in the vessel is >110° C., preferably 111–119° C., more preferably 114–116° C. The precise amount of water removed from the mixture as vapor will vary depending e.g., on the intended use for the converted mixture. Preferably, at least 30% (w/v) of the water is removed from the aqueous dispersion as vapor, more preferably, at least about 50% (w/v) of the water is removed, even more preferably, at least about 75% or about 90% (w/v) of the water is removed, and most preferably at least about 99% of the water is removed.

Specific adaptations of the foregoing methods can facilitate the solvent exchange process. For example, it will often be helpful to provide conditions of high sheer mixing between the polythiophene mixture and the exchanging solvent mixture. Preferred conditions reduce or prevent agglomeration (congealing) of Baytron® P such as a mixture of PEDOT/PSS beyond a particle size of about 1 micron. Many Baytron® P formulations are provided as aqueous dispersions in which each particle has a size of about 1 micron. In embodiments in which the high sheer mixing conditions are employed, presence of unsuitably large particles and agglomerates can be reduced or avoided. The converted Baytron® P formulations, such as PEDOT/PSS formulations, can have much better uniformity. A wide variety of mixing implementations can be used to provide high sheer mixing conditions. Specific examples of such implementations are provided below.

In a more specific example of this embodiment, the method further includes contacting the heated solvent combination with at least one non-reactive gas. That gas is typically added to the vessel as a flow or jet stream to facilitate removal of the water solvent from the mixture. Preferably, the gas flow is configured to assist movement of vaporized water toward a chamber or trap as described below. Examples of suitable gases include nitrogen, a noble gas (He, Ar, ect.); or a mixture thereof. If desired, the gas can be pre-heated to about the temperature of the heated solvent combination to minimize cooling of the solvent in the vessel. The gas can be added to the vessel in several ways including use of a gas pump. The volume of gas introduced into the vessel will vary with intended use but will generally be sufficient to provide for good removal of water vapor from the vessel into the chamber or trap.

After the desired amount of the water is replaced by the solvent combination, the converted polythiophene mixture is collected from the vessel generally as a dispersion that consists of a polythiophene, such as PEDOT/PSS, dispersed in a specific mixture of at least two or more solvents selected from ethylene glycol, NMP, and DMAC. In a preferred example of the present invention, the dispersion will essentially consist of ethylene glycol and NMP and PEDOT/PSS; or DMAC and ethylene glycol and PEDOT/PSS; or a specific mixture of any two or all three of these solvents and PEDOT/PSS. Such dispersions are particularly preferred for the uses disclosed herein including those specific applications intended for Baytron® P aqueous formulations. If needed, the solvent exchange methods disclosed herein can be repeated e.g,. one, two or three times, with the already converted polythiophene mixture to introduce one or more other desired solvents therein including combinations of the same or different solvents.

A more specific solvent exchange method according to the present disclosure involves exchanging a specific mixture of ethylene glycol (EG) and N-methylpyrrolidone (NMP) for water in an aqueous dispersion that includes poly-3,4 ethylene dioxythiophene/anion formulation. An example of a preferred preparation is a Baytron® formulation, preferably Baytron® P. In one embodiment, the method includes at least one and preferably all of the following steps:

a) heating an amount of N-methylpyrrolidone (NMP) and ethylene glycol in a first vessel to a temperature of between from about 100° C. to about 250° C., wherein the relative amount of NMP to ethylene glycol can range from 95% to 5% by volume and b) contacting the heated N-methylpyrrolidone (NMP) and ethylene glycol solvent mixture with an amount of the colloidal water dispersion comprising water and poly-3,4 ethylenedioxythiophene/polystyrene sulfonate, wherein the dispersion is added to the surface of the heated solvent at a rate of between from about 0.1 to about 1000 mls/minute, preferably about 1 to 100 mls/minute, more preferably about 10 mls/minute, the contact being sufficient to remove at least part of the water from the dispersion as vapor;

c) optionally an organic compound may be added at any time during or after the exchange process; and d) replacing or exchanging the water removed from the dispersion with the N-methylpyrrolidone (NMP) and ethylene glycol solvent mixture.

Alternatively, this method could be performed using a specific mixture of DMAC and EG or a specific mixture containing all three solvents (DMAC, NMP and EG) if desired.

As mentioned, it is usually desirable to maximize contact between the exchange solvent combination and the mixture comprising the poly-3,4 ethylene dioxythiophene aqueous dispersion. For example, the ratio of the amount of a specific mixture of N-methylpyrrolidone (NMP) and ethylene glycol (EG) or dimethylacetamide (DMAC) and ethylene glycol to the amount of the polythiophene mixture is desirably about 1, preferably between from about 0.1 to about 10,000,000 or more, more preferably between from about 0.5 to about 20 or between from about 1.5 to about 10.

In a preferred example of the method, the optionally substituted poly-3,4-alkylene dioxythiophene is obtained as a colloidal water dispersion, preferably also including at least one counter ion. More preferably, the counter ion is polystyrenesulfonic acid (PSS) and the optionally substituted poly-3,4-alkylene dioxythiophene is poly3,4-ethylene-dioxythiophene (PEDOT). A particular formulation of such a polydioxythiophene is Baytron® P.

Particular methods for forming a composition include forming a composition from the mixture, preferably a conductive coating composition that is subjected to at least one drying step, preferably after step c) (solvent exchange step) of the methods discussed above. Typically, formation of the composition involves isolating that material from the vessel used to conduct the method, for instance, by filtration, centrifugation and the like.

A wide spectrum of drying treatment steps may be used provided they facilitate production of compositions with at least good surface resistance. By the phrase "good surface resistance" is meant a surface resistance as determined by following the general procedure detailed in ASTM F374 ranging from about 10 to about 3000 ohms/square for compositions having a thickness of between from about 10 nm to about 250 nm, preferably about 40 nm to about 150 nm. Additionally preferred drying treatment steps provide a good surface resistance ie., between from about 10 to about 10,000 (ohm/sq), preferably about 200 to about 650 (ohm/sq) for compositions having a thickness of between from about 10 nm to about 250 nm, preferably about 40 nm to about 150 nm. Still further preferred drying treatments provide compositions with good optical transmission properties, that is, at least about 70%, preferably at least about 90% between about 300 nm and 600 nm when compared with a suitable control, eg., Baytron® P.

It will be apparent that it is possible to relate resistivity and surface resistance, particularly for those compositions disclosed herein provided as coating compositions. In general, the relationship between resistivity and surface resistance is defined by the following mathematical formula:

$$\text{Resistivity} = \text{Pie}/(\ln 2) * k * t * (V/I),$$

wherein, V (measured voltage)/I (applied current) is the surface resistance with the unit of ohm/square for the four point probe measurement technique, Pie/(ln 2) is a constant, k is the geometrical correction factor (related to film thickness, probe spacing and sample size) and t is the film thickness.

Volume Resistivity of the selected coatings were determined more accurately by employing van der Pauw method ("A Method of Measuring Specific Resistivity and Hall Effect of Discs of Arbitrary Shapes," L. J. van der Pauw, Philips Res. Repts. 13, 1–9 (1958)) for the samples with indium ohmic contacts. This method is the most accurate and widely used technique to measure Resistivity of the thin coatings/films with the uniform thickness and irregular shape. In this method, the sample geometrical factor is already incorporated into the data reduction process, and therefore, Resistivity of the samples can be accurately measured. By using the same test sample and test set-up with an external magnetic field supply, charge carrier mobility and carrier concentrations were determined by employing Hall effect measurement technique. ("Standard Test Methods for Measuring Resistivity and Hall Coefficient and Determining Hall Mobility in Single-Crystal Semiconductors," ASTM Designation F76, Annual Book of ASTM Standards, Vol. 10.05 (2000), and E. H. Hall, "On a New Action of the Magnet on Electrical Current," Amer. J. Math. 2, 287–292 (1879)).

A result of van der Pauw/Hall measurement of the coatings is shown in FIG. 1. This coating was prepared by first performing the solvent exchange method using the aqueous dispersion of Baytron® P using a solvent mixture comprised of ethylene glycol (80%) and N-methyl-pyrrolidinone (20%). This particular coating, prepared by a spin-coating method on a glass substrate, exhibited very high hole (positive charge carrier) mobility of 4.08 $Cm^2$/V.S.

As discussed, a wide variety of suitable drying treatments may be used. For example, in one embodiment, the drying treatment includes subjecting a composition, preferably a coating composition, to a temperature of from between about room temperature (25° C.) to about 200 C. for less than about a day (24 hours). As also mentioned, two or more drying treatment steps that are the same or different may be used if needed. More specific drying treatments include subjecting the composition to from between about 50° C. to about 150° C. for less than about 12 hours, preferably about 80° C. for less than about 5 hours, typically about an hour or less, e.g., from about 1 to about 15 minutes. In a more specific embodiment, the drying treatment includes subjecting the coating composition to room temperature (25° C.) for less about two hours or less followed by treatment at about 80° C. for between from about 1 to about 15 minutes. Preferably, the composition has a thickness of from between about 50 nm to about 1000 nm, preferably from between about 60 nm to about 750 nm.

Compositions made in accord with the solvent exchange methods are disclosed herein. An example of such a composition is an optionally substituted poly-3,4 alkylene dioxythiophene. Preferably, that composition has between from about 30% (w/v) to about 100% (w/v) dimethylacetamide (DMAC) and ethylene glycol or N-methylpyrrolidone (NMP) and ethylene glycol (EG) or mixtures of any three (NMP, EG, DMAc). Preferably, the optionally substituted poly-3,4-alkylene dioxythiophene is poly-3,4-ethylene dioxythiophene commercially available as or Baytron® P.

Preferred compositions may also include at least one additive, such as those additives disclosed previously. An example of such an additive is ferric toluene sulfonic acid (Baytron® C). Preferably, the ferric toluene sulfonic acid is present in the composition in trace amounts.

In some embodiments, it will be desirable to combine the compositions disclosed herein with at least one additive. Suitable organic, polymeric binders and/or organic, low-molecular cross-linking agents may also be added to the coating solutions. Appropriate binders are described, for example, in EP-A 564 911. Epoxysilanes, such as those provided by the EP-A 564 911 application, can be added to the coating solutions, particularly for the production of adhesive layers on glass.

Particular converted polydioxythiophene compositions are preferably used in what is known in the field as a dispersion or solution in a cationic form. That is, a form in which those compositions are obtained, for example, by treating the thiophenes with oxidizing agents. Known oxidizing agents, such as potassium peroxodisulphate are typically used for the oxidation. Also typically, oxidized polydioxythiophenes acquire positive charges. These charges are not shown in Formula (I), since the number and positions of such charges are not needed to understand and appreciate the invention. These positive charges are balanced by the negative charge of the anion or polyanion present in the aqueous dispersion.

As also discussed, a wide spectrum of compositions, particularly in a coating or film format, are disclosed herein. Preferred coating compositions include at least one of the foregoing converted (solvent exchanged) optionally substituted polythiophenes, and at least one suitable organic polymer, co-polymer or mixture thereof. Methods for adding such polymers to the converted polythiophenes are known in the field and are exemplified below. Suitable polymers, co-polymers and mixtures include, but are not limited to, polycarbonate, polystyrene, polyacrylates, polyesters such as polyethylene terephthalate, polybutylene terephthalate, polyethylene naphthalate, polyamides, polyimides, optionally glass-fibre reinforced epoxy resins, cellulose derivatives such as cellulose triacetate, polyolefins such as polyethylene, polypropylene. Examples of preferred polyimides for use in preparing the films include TOR-NC (Triton Systems, Inc.), Matrimid (1,3-isobenzofulrandione, 5,5'-carbonylbis-polymer with 1 (or 3)-(4-aminophenyl)-2,3 dihydro-1,3,3 (or 1,1,3)-trim 5-amine) (Ciba); and Aurum (Mitsui Toatsu).

More preferred coatings and films are conductive and include a weight ratio of at least one of the converted polythiophene to the foregoing polymers, co-polymers, graft co-polymers (e.g., TOR-NC, Matrimid, Aurum, or a mixture thereof) is about 10:90 to about 0.1 to 99.9, preferably 6:94 to about 0.5:99.5. A preferred film composition is the TOR-NC polyimide and converted Baytron® P formulation. More preferred coating films made from TOR-CP include between from about 0.5% (w/w) to about 5% (w/w) of the TOR-CP relative to the polyimide of interest, preferably between from about 1% (w/w) to about 4% (w/w). Other polyimide/polydioxythiophene combinations may be better suited for other applications.

In embodiments in which the Baytron® P polydioxythiophene aqueous dispersion has at least about 90% (w/v) of the water exchanged with NMP and ethylene glycol or DMAc and ethylene glycol or a specific mixture of any two or all three, preferably at least about 95% (w/v) of the water solvent exchanged with NMP and ethylene glycol or DMAc and ethylene glycol or a specific mixture of any two or all three, and more preferably at least about 99% (w/v) up to 100% (w/v) so exchanged. The converted Baytron® P formulation will often be referred to herein as TOR-CP.

The compositions disclosed herein, including preferred conductive films and coatings, can be produced by reference to recognized processes disclosed in U.S. Pat. Nos. 5,766,515, 6,083,835, 5,300,575, and 6,157,479. Preferred production processes involve, for example, spraying, application by a doctor blade, dipping, application with roller applicator systems, by printing processes such as gravure printing, silk screen printing, curtain casting, and can be dried at room temperature or at temperatures of up to 300° C., preferably up to 200° C. Suitable substrates are transparent substrates such as glass or plastic films or hybrids thereof (e.g. polyesters, such as polyethylene terephthalate and polyethylene naphthalate, polycarbonate, polyacrylate, polysulfone and polyimide film and flexible glass). Other material forms such as particles, nanoparticles, carbon nanotubes, fibers, foams, moldings and adhesives can be similarly coated with the disclosed compositions. Illustrative of such fibers include those made whole or in part from Kevlar™ (aramide), polyethylene, PBO (polybenzoxazole), polyester, nylon, polyamide, glass; as well as combinations thereof. Preferred fibers are about 0.5 to 50 deniers, preferably about 1 to about 10 deniers. Application of the disclosed compositions, films, and coatings to fibers will help improve the electrical conductivity of the fibers.

The formulations of the invention are also suitable for use as coatings on various substrates which require the formulation to quickly and uniformly wet the substrate. In addition they must adhere tenaciously to the substrate under a variety of environmental conditions. The invention disclosed herein provides for improved adhesion to glass, flexible glass and a variety of polymers under conditions typically encountered in the use of coated articles such as under conditions of temperature and humidity.

The disclosed compositions and methods of the invention are compatible with techniques for making spin-coated filaments, particularly monofiliments, by electrospinning. See Reneker, D. H. *Nanometer Diameter Fibres of Polymer Produced by Electrospinning,* Fourth Foresight Conference on Molecular Nanotechnology.

For some applications, it will be useful to anneal the films and coatings e.g, to increase electrical conductivity. Methods for annealing a wide variety of suitable films and coatings have been disclosed in the U.S. Pat. No. 6,083,635, for example.

The coatings and films of this invention can be used in a variety of thicknesses depending, for example, on intended use and desired transparency and conductivity parameters. A preferred thickness is from about 0.005 to about 500 $\mu$m, more preferably from about 0.05 to about 10 $\mu$m. Preferred conductive coating materials of the invention can be configured as a layer having a surface resistance of between from about 10 to about $10^{12}$ ohms/square. Also preferred are coatings that feature a surface resistance of from about 0.1 to about 3000 ohms/square, preferably from about 10 to about 4000 ohms/square, more preferably from about 10 to about 2000 $\Omega$/sq.

As disclosed herein and in the prior provisional application No. 06/269,606 filed on Feb. 16, 2001, a method to produce a wide spectrum of organic solvent-based conducting polymer systems has been provided. The resulting products of the solvent exchange method exhibit an improved combination of properties as compared to the aqueous based precursor dispersion. These products are referred to as TOR-CP coatings and are also referred to and used interchangeably with "product from the solvent exchange method" and "Eleflex™" and the like. TOR-CP is a PEDOT:PSS based conductive polymer system that has had the water exchanged with one or more organic solvents, such as NMP, which has a very low water content of less than 3% water. Disclosed herein is the further investigation of the solvent exchange method wherein it has been found that by performing said method with specific mixtures of NMP and ethylene glycol, a coating material with an even superior combination of electrical conductivity, optical transparency, environmental stability and adhesion to a variety of substrates is obtained.

The excellent combination of electric conductivity, high optical transparency and environmental stability of the coatings derived from the compositions disclosed herein demonstrates that it is an ideal candidate material for many electrical and opto-electronic device applications. Furthermore, low water contents in the solvent exchanged product provide additional benefit of ease-of manufacturing of opto-electronic devices that contain ITO electrodes. In addition, the non-acidic and non-hygroscopic nature of the coatings from the solvent exchanged product further enable a long lifetime or less performance degradation of the devices fabricated using the compositions of the invention. The unique properties of the coatings derived from solvent exchanged product of the invention further suggest that it can replace transparent electrodes of ITO in certain applications. In such case, all organic material based electro-optic devices can be realized, including flexible plastic substrates (to make thin film transistors) that will significantly reduce manufacturing costs of many electric and opto-electronic devices and provide opportunities of producing advanced electric and opto-electronic devices that requires flexible substrates.

The conductive films and coatings disclosed herein can be useful in a wide range of applications, including those that require good electrical conductivity e.g., as electrodes in electroluminescent (OLED) displays, in liquid crystalline displays, in solid electrolyte capacitors, for the deposition of metals such as copper, nickel, for example, in the manufacture of printed circuits, in solar cells, in electrochromic displays or for the screening of electromagnetic radiation or for leading away electrical charges, for example, in picture tubes or as anticorrosive coatings on metals, for the production of touch screens, back lights for displays, smart windows and thin film transistors. Other areas of application are systems for picture production, for example, silver halide photography, dry-plate systems, electrophotography.

The conductive coatings and films disclosed herein are well-suited for optional coating with further layers such as those reported in the U.S. Pat. No. 6,083,635, for example.

There are numerous articles of manufacture that comprise or consist of at least one of the compositions disclosed herein. Examples of such articles include, but are not limited to, an antiradiation coating, antistatic coating, battery, catalyst, deicer panel, electrochromic window, smart window, electrochromic display, touch screen display, back light for displays, OLEDs, electromagnetic shielding, electromechanical actuator, electronic membrane, embedded array antenna, fuel cell, infrared reflector, intelligent material, junction device (PV), such as photovoltaic cells, lithographic resist, non-corrosive paint, non-linear optical device, conductive paint, polymer electrolyte, radar dish, redox capacitor, sealant, semiconductor circuit, sensor, smart window, telecom device, waveguide, or wire (low current). Preferably, the electromechanical actuator is one of a biomedical device, micropositioner, microsorter, microtweezer, or microvalve. Also preferably, the sensor is one of a biological, chemical, electrochemical, irradiation dosage, mechanical shock, temperature, temperature limit, or time-temperature sensor.

There are also numerous articles of manufacture that include the electronic implementations of this invention. For example, the solvent exchanged product can be used to fabricate a conductive coating onto a rigid or flexible substrate and exhibit high electrical conductivity, high transparency, good adhesion to the substrate, and environmental stability (i.e., properties do not degrade significantly upon exposure to air or moisture). This coated substrate is subsequently use to fabricate a sub-component or becomes a component of a complex electrical or opto-electronic device such as those previously mentioned. Due to the properties of the coating produced by the method disclosed herein, said device exhibits an improvement in performance relative to the same device fabricated using a coating derived from Baytron® P aqueous dispersion. The coated substrate could be a metal, glass, ceramic organic or other particle wherein said coated particle is used in an ink, paint or coating formulation. Exemplary articles include a touch screen panel for a display, liquid crystal display, electrophoretic ink display, polymer disperse liquid crystal (PDLC), back light for a display, smart window, OLED, TFT or an identification tag such as a smart label adapted for use in consumer good, an anti-corrosive ink, conductive ink formulation for ink jet printing of electronic circuitry. Particular examples of such consumer goods include a toy or supermarket item.

The combination of properties that the solvent exchanged product exhibits and the fact that it is now in an organic solvent mixture make it ideal for use in a variety of coating processes that are very cost effective such as ink-jet printing or modifications thereof, direct writing, continuous roll-to-roll coating of web and spraying. It can be used to fabricate conductive inks and paints. In addition, it allows for the coating of a variety of substrates in a continuous fashion such as fibers, moldings, particles, nanoparticles, carbon nanotubes, foams, laminates and the like.

In particular embodiments, electrically conductive and optically transparent organic solvent-based polymer coatings are provided. Also provided are methods for the preparation of the same for applications in which a specific combination of electrical conductivity, flexibility, adhesion, transparency and environmental stability are necessary.

EXAMPLES

Having generally described the invention, a more complete understanding thereof can be obtained by reference to the following examples that are provided for purposes of illustration only and do not limit the invention.

Example 1

Solvent Exchange Using a Specific Mixture of Ethylene Glycol (EG) and NMP

Into a 1L four neck reactor equipped with an addition funnel in combination with a peristaltic pump, nitrogen gas inlet, homogenizer (T-25 basic homogenizer with a 19 mm diameter dispersing tool), Dean Stark trap and condenser (hooked up with a water chiller), a secondary liquid trap and thermometer was placed a mixture of NMP (40 mL) and ethylene glycol (160 mL). The solvent mixture was heated to 120° C. using an oil bath and a temperature controller. Upon reaching 115° C., the homogenizer, the chiller for the condenser and the nitrogen flow (8 L/minute) were turned on. Baytron® P aqueous dispersion (150 mL, as-received from Bayer AG) was placed in the addition funnel and was added at a rate of 2 mL/minute. After 1.5 hour, all of the Baytron® P aqueous dispersion had been added. After one additional hour, 4-hydroxybenezenesulfonic acid (0.11 gram) was added to the mixture. Heating at 120° C. was continued for an additional 0.6 hour and the heat was subsequently removed. The total amount of liquid collected in the primary and secondary traps was about 146 mL. The solvent exchange process was terminated when the solvent mixture in the vessel reached a temperature of 115° C. The resulting solvent exchanged product was designated Lot 22 and characterized. It was used to make coatings on glass and polyethylene terephthalate (PET) film. Characterization data is presented below.

| | Chemistry Data | | |
|---|---|---|---|
| Batch # | Solid content (wt %) | Viscosity (cp) | Particle size (nm) |
| Lot 22 | 1.52 | 780 | 442–519 |

Coating properties on glass substrate (dried at 100° C. for 5 min) Lot 22 center of wafer

| # layers | % T | Rs (kΩ/□) | thickness (nm) | conductivity (S/cm) |
|---|---|---|---|---|
| 1 | 85.6 | 1.32 | 105 | 72.2 |
| 2 | 78.4 | 1.00 | 170 | 58.8 |

Coating properties on glass substrate (dried at 100° C. for 5 min) Lot 22 edge of wafer

| # layers | % T | Rs (kΩ/□) | thickness (nm) | conductivity (S/cm) |
|---|---|---|---|---|
| 1 | 85.6 | 2.05 | 70 | 69.7 |
| 2 | 78.4 | 0.92 | 160 | 67.9 |

Coating properties on PET substrate (dried at 100° C. for 5 min) Lot 22

| # layers | Spin Speed | % T | Haze | Rs (kΩ/□) | Pencil Test | Adhesion Test |
|---|---|---|---|---|---|---|
| 1 | 2000 | 79.2 | 0.64 | 1 | >6 H | 5 B |
| 1 | 2000 | 77 | 0.78 | 0.75 | >6 H | 5 B |
| 1 | 3000 | 85.2 | 0.72 | 1.7 | >6 H | 5 B |

Example 2

Solvent Exchange Using a Specific Mixture of Ethylene Glycol (EG) and NMP

Into a 2L four neck reactor equipped with an addition funnel in combination with a peristaltic pump, nitrogen gas inlet, homogenizer (T-25 basic homogenizer with a 19 mm diameter dispersing tool), Dean Stark trap and condenser (hooked up with a water chiller), a secondary liquid trap and thermometer was placed a mixture of NMP (200 mL) and ethylene glycol (800 mL). The solvent mixture was heated to 120° C. using an oil bath and a temperature controller. Upon reaching 115° C., the homogenizer, the chiller for the condenser and the nitrogen flow (16–40 L/minute) were turned on. Baytron® P aqueous dispersion (750 mL, as-received from Bayer AG) was placed in the addition funnel and was added at a rate of 5 mL/minute. After 2.75 hour, all of the Baytron® P aqueous dispersion had been added. After 4 additional hours, 4-hydroxybenezenesulfonic acid (0.5 gram) was added to the mixture. Heating at 120° C. was continued for an additional 0.12 hour and the heat was subsequently removed. The total amount of liquid collected in the primary and secondary traps was about 539 mL. The solvent exchange process was terminated when the solvent mixture in the vessel reached a temperature of 115° C. The resulting solvent exchanged product was designated Lot 134 and characterized. It was used to make coatings on glass and polyethylene terephthalate (PET) film. To insure accuracy, this lot was characterized by two different technicians. Characterization data is presented below.

Chemistry Data

| Batch # | Solid content (wt %) | Viscosity (cp) | Particle size (nm) |
|---|---|---|---|
| 134 | 1.29 | 491 | 12.2% at 90–170<br>87.8% at 2180–2550 |

Coating properties on glass substrate (dried at 100° C. for 5 min) Lot 134

| Spin Speed | % T | Rs (kΩ/□) | thickness (nm) | conductivity (S/cm) |
|---|---|---|---|---|
| 2000 | 86.8 | 2.3 | | |
| 1800 | 86.1 | 1.9 | | |

Coating properties on PET substrate (dried at 100° C. for 5 min) Lot 134

| # layers | Spin Speed | % T | Haze | Rs (kΩ/□) | Pencil Test | Adhesion Test |
|---|---|---|---|---|---|---|
| 1 | 2000 | 86.6 | 0.7 | 2.2–2.3 | — | — |

Chemistry Data

| Batch # | Solid content (wt %) | Viscosity (cp) | Particle size (nm) |
|---|---|---|---|
| 134 | 1.27 | 344 | 5% at 65–145<br>95% at 2558–3000 |

Coating properties on glass substrate (dried at 100° C. for 5 min) Lot 134

| Spin Speed | % T | Rs (kΩ/□) | thickness (nm) | conductivity (S/cm) |
|---|---|---|---|---|
| 2000 | 88.2 | 2.3 | — | — |

Coating properties of Lot 134 on PET substrate (dried at 100° C. for 5 min)

| # layers | Spin Speed | % T | Haze | Rs (kΩ/□) | Hardness | Adhesion |
|---|---|---|---|---|---|---|
| 1 | 2000 | 85.6 | 0.75 | 2.15 | 4 H | 4 B |
| 1 | 3000 | 88.5 | 1.07 | 4.60 | 3 H | 5 B |

Example 3

Solvent Exchange Using a Specific Mixture of Ethylene Glycol (EG) and NMP

Into a 2L four neck reactor equipped with an addition funnel in combination with a peristaltic pump, nitrogen gas inlet, homogenizer (T-25 basic homogenizer with a 19 mm diameter dispersing tool), Dean Stark trap and condenser (hooked up with a water chiller), a secondary liquid trap and thermometer was placed a mixture of NMP (200 mL) and ethylene glycol (800 mL). The solvent mixture was heated to 120° C. using an oil bath and a temperature controller. Upon reaching 115° C., the homogenizer, the chiller for the condenser and the nitrogen flow (24 L/minute) were turned on. Baytron® P aqueous dispersion (750 mL, as-received from Bayer AG) was placed in the addition funnel and was added at a rate of 5 mL/minute. After 3 hours, all of the Baytron® P aqueous dispersion had been added. After 3 additional hours, 4-hydroxybenezenesulfonic acid (0.5 gram) was added to the mixture. Heating at 120° C. was continued for an additional 0.12 hour and the heat was subsequently removed. The total amount of liquid collected in the primary and secondary traps was about 603 mL. The solvent exchange process was terminated when the solvent mixture in the vessel reached a temperature of 115° C. The resulting solvent exchanged product was designated Lot 136 and characterized. It was used to make coatings on glass and polyethylene terephthalate (PET) film. To insure accuracy, this lot was characterized by two different technicians. Characterization data is presented below.

| | Chemistry Data | | |
|---|---|---|---|
| Batch # | Solid content (wt %) | Viscosity (cp) | Particle size (nm) |
| 136 | 1.26 | 484 | — |

Coating properties on glass substrate (dried at 100° C. for 5 min) Lot 136

| Spin Speed | % T | Rs (kΩ/□) | thickness (nm) | conductivity (S/cm) |
|---|---|---|---|---|
| 2000 | 88.2 | 2.4 | — | — |
| 1800 | 86.6 | 1.96 | — | — |

Coating properties on PET substrate (dried at 100° C. for 5 min) Lot 136

| # layers | Spin Speed | % T | Haze | Rs (kΩ/□) | Pencil Test | Adhesion Test |
|---|---|---|---|---|---|---|
| 1 | 2000 | 87.0 | 0.71 | 2.5 | — | — |

| | Chemistry Data | | |
|---|---|---|---|
| Batch # | Solid content (wt %) | Viscosity (cp) | Particle size (nm) |
| 136 | 1.24 | 312 | 5% @ 47–170 95% @ 2558–3000 |

Coating properties on glass substrate (dried at 100° C. for 5 min) Lot 136

| Spin Speed | % T | Rs (kΩ/□) | thickness (nm) | conductivity (S/cm) |
|---|---|---|---|---|
| 2000 | 88.3 | 2.75 | — | — |

Coating properties of Lot 136 on PET substrate (dried at 100° C. for 5 min)

| # layers | Spin Speed | % T | Haze | Rs | Hardness | Adhesion |
|---|---|---|---|---|---|---|
| 1 | 2000 | 86.0 | 0.80 | 2.20 | 3 H | 4 B |
| 1 | 3000 | 88.1 | 1.08 | 4.85 | 3 H | 4 B |

Example 4

Solvent Exchange Using a Specific Mixture of Ethylene Glycol (EG) and NMP

Into a 2L four neck reactor equipped with an addition funnel in combination with a peristaltic pump, nitrogen gas inlet, homogenizer (T-25 basic homogenizer with a 19 mm diameter dispersing tool), Dean Stark trap and condenser (hooked up with a water chiller), a secondary liquid trap and thermometer was placed a mixture of NMP (200 mL) and ethylene glycol (800 mL). The solvent mixture was heated to 120° C. using an oil bath and a temperature controller. Upon reaching 115° C., the homogenizer, the chiller for the condenser and the nitrogen flow (24 L/minute) were turned on. Baytron® P aqueous dispersion (750 mL, as-received from Bayer AG) was placed in the addition funnel and was added at a rate of 5 mL/minute. After 2.5 hours, the temperature was increased to 130° C. After a total of 3 hours, all of the Baytron® P aqueous dispersion had been added. After 2 additional hours, 4-hydroxybenezene sulfonic acid (0.5 gram) was added to the mixture. Heating at 130° C. was continued for an additional 0.12 hour and the heat was subsequently removed. The total amount of liquid collected in the primary and secondary traps was about 620 mL. The solvent exchange process was terminated when the solvent mixture in the vessel reached a temperature of 115° C. The resulting solvent exchanged product was designated Lot 138 and characterized. It was used to make coatings on glass and polyethylene terephthalate (PET) film. To insure accuracy, this lot was characterized by two different technicians. Characterization data is presented below.

| | Chemistry Data | | |
|---|---|---|---|
| Batch # | Solid content (wt %) | Viscosity (cp) | Particle size (nm) |
| 138 | 1.15 | | |

Coating properties on glass substrate (dried at 100° C. for 5 min)
Lot 138

| Spin Speed | % T | Rs (kΩ/□) | thickness (nm) | conductivity (S/cm) |
|---|---|---|---|---|
| 2000 | 87.9 | 2.8 | — | — |
| 1800 | 87.2 | 2.26 | — | — |
| 1600 | 86.2 | 1.9 | — | — |

Coating properties on PET substrate (dried at 100° C. for 5 min)
Lot 138

| # layers | Spin Speed | % T | Haze | Rs (kΩ/□) | Pencil Test | Adhesion Test |
|---|---|---|---|---|---|---|
| 1 | 2000 | 87.0 | 0.71 | 2.5 | — | — |

Chemistry Data

| Batch # | Solid content (wt %) | Viscosity (cp) | Particle size (nm) |
|---|---|---|---|
| 138 | 1.07 | 349 | 519–837 |

Coating properties of Lot 138 on glass substrate
(dried at 100° C. for 5 min)

| # layers | % T | Rs-center (kΩ/□) | Rs-edge (kΩ/□) |
|---|---|---|---|
| 1 | 87.3 | 1.87 | 2.73 |
| 2 | 82.2 | 1.25 | 1.27 |

Coating properties of Lot 138 on PET substrate
(dried at 100° C. for 5 min)

| # layers | Spin Speed | % T | Haze | Rs | Hardness | Adhesion |
|---|---|---|---|---|---|---|
| 1 | 2000 | 85.1 | 0.69 | 1.96 | 3 H | 4 B |
| 1 | 3000 | 88.2 | 0.67 | 2.45 | 3 H | 5 B |

Example 5

Solvent Exchange Using a Specific Mixture of Ethylene Glycol (EG) and NMP

Into a 2L four neck reactor equipped with an addition funnel in combination with a peristaltic pump, nitrogen gas inlet, homogenizer (T-25 basic homogenizer with a 19 mm diameter dispersing tool), Dean Stark trap and condenser (hooked up with a water chiller), a secondary liquid trap and thermometer was placed a mixture of NMP (200 mL) and ethylene glycol (800 mL). The solvent mixture was heated to 120° C. using an oil bath and a temperature controller. Upon reaching 115° C., the homogenizer, the chiller for the condenser and the nitrogen flow (24 L/minute) were turned on. Baytron® P aqueous dispersion (750 mL, as-received from Bayer AG) was placed in the addition funnel and was added at a rate of 5 mL/minute. After 2 hours, the temperature was increased to 130° C. After a total of 3 hours, all of the Baytron® P aqueous dispersion had been added. After 2 additional hours, 4-hydroxybenezene sulfonic acid (0.5 gram) was added to the mixture. Heating at 130° C. was continued for an additional 1 hour and the heat was subsequently removed. The total amount of liquid collected in the primary and secondary traps was about 668 mL. The solvent exchange process was terminated when the solvent mixture in the vessel reached a temperature of 115° C. The resulting solvent exchanged product was designated Lot 141 and characterized. It was used to make coatings on glass and polyethylene terephthalate (PET) film. To insure accuracy, this lot was characterized by two different technicians. Characterization data is presented below.

Chemistry Data

| Batch # | Solid content (wt %) | Viscosity (cp) | Particle size (nm) |
|---|---|---|---|
| 141 | 1.24 | | |

Coating properties on glass substrate (dried at 100° C. for 5 min)
Lot 141

| Spin Speed | % T | Rs (kΩ/□) | thickness (nm) | conductivity (S/cm) |
|---|---|---|---|---|
| 2000 | 87.1 | 2.2 | | |

Chemistry Data

| Batch # | Solid content (wt %) | Viscosity (cp) | Particle size (nm) |
|---|---|---|---|
| 141 | 1.22 | 345 | 442–837 |

Coating properties of Lot 141 on glass substrate
(dried at 100° C. for 5 min)

| # layers | % T | Rs-center (kΩ/□) | Rs-edge (kΩ/□) |
|---|---|---|---|
| 1 | 87.3 | 1.98 | 2.71 |
| 2 | 82.8 | 1.25 | 1.53 |

Coating properties of Lot 141 on PET substrate
(dried at 100° C. for 5 min)

| # layers | Spin Speed | % T | Haze | Rs (kΩ/□) | Hardness | Adhesion |
|---|---|---|---|---|---|---|
| 1 | 2000 | 84.5 | 1.00 | 1.81 | 2 H | 4 B |
| 1 | 3000 | 87.7 | 1.02 | 3.63 | 3 H | 5 B |

Example 6

Solvent Exchange Using a Specific Mixture of Ethylene Glycol (EG) and NMP

Into a 2L four neck reactor equipped with an addition funnel in combination with a peristaltic pump, nitrogen gas inlet, homogenizer (T-25 basic homogenizer with a 19 mm diameter dispersing tool), Dean Stark trap and condenser (hooked up with a water chiller), a secondary liquid trap and thermometer was placed a mixture of NMP (200 mL) and ethylene glycol (800 mL). The solvent mixture was heated to 120° C. using an oil bath and a temperature controller. Upon reaching 115° C., the homogenizer, the chiller for the condenser and the nitrogen flow (24 L/minute) were turned on. Baytron® P aqueous dispersion (750 mL, as-received from Bayer AG) was placed in the addition funnel and was added at a rate of 5 mL/minute. After 2 hours, the temperature was increased to 130° C. After a total of 3 hours, all of the Baytron® P aqueous dispersion had been added. After 2 additional hours, 4-hydroxybenezene sulfonic acid (0.5 gram) was added to the mixture. Heating at 130° C. was continued for an additional 0.5 hour and the heat was subsequently removed. The total amount of liquid collected in the primary and secondary traps was about 678 mL. The solvent exchange process was terminated when the solvent mixture in the vessel reached a temperature of 115° C. The resulting solvent exchanged product was designated Lot 143 and characterized. It was used to make coatings on glass and polyethylene terephthalate (PET) film. Characterization data is presented below.

| | Chemistry Data | | |
|---|---|---|---|
| Batch # | Solid content (wt %) | Viscosity (cp) | Particle size (nm) |
| 143 | 1.17 | 257 | 377–442 |

| Coating properties of Lot 143 on glass substrate (dried at 100° C. for 5 min) | | | |
|---|---|---|---|
| # layers | % T | Rs-center (kΩ/□) | Rs-edge (kΩ/□) |
| 1 | 87.7 | 2.31 | 2.88 |
| 2 | 84.0 | 1.30 | 1.56 |

| Coating properties of Lot 143 on PET substrate (dried at 100° C. for 5 min) | | | | | | |
|---|---|---|---|---|---|---|
| # layers | Spin Speed | % T | Haze | Rs (kΩ/□) | Hardness | Adhesion |
| 1 | 2000 | 86.0 | 0.63 | 1.94 | 2 H | 4 B |
| 1 | 3000 | 88.0 | 0.66 | 3.53 | 4 H | 4 B |

Example 7

Solvent Exchange Using a Specific Mixture of Ethylene Glycol (EG) and NMP

The solvent exchange method was performed on a broad concentration range of ethylene glycol (EG)/NMP as shown in table 1 below. The solvent exchange process was performed in the same manner as described in Examples 1–6. The EG/NMP ratio ranged from 100/0 to 20/80. Coatings were prepared from the resulting solvent exchanged organic dispersions (Eleflex) and characterized. The results are presented in table 2 below. The EG/NMP solvent exchanged organic dispersions are referred to as Eleflex™.

TABLE 1

EG/NMP Solvent Exchange Experiments (Eleflex ™)

| | | reagents added (ml) | | | | products recovered (ml) | | |
|---|---|---|---|---|---|---|---|---|
| Sample | EG:NMP (v/v) | Baytron P | EG | NMP | sum | Eleflex | distillate | sum |
| QZ01-113 | 20:80 | 150 | 40 | 160 | 350 | 195 | 80 | 275 |
| QZ01-116 | 50:50 | 150 | 100 | 100 | 350 | 168 | 120 | 288 |
| QZ01-119 | 80:20 | 150 | 160 | 40 | 350 | 156 | 120 | 276 |
| QZ01-134 | 80:20 | 150 | 160 | 40 | 350 | 160 | 130 | 290 |
| QZ01-120 | 95:5 | 150 | 190 | 10 | 350 | 160 | 120 | 280 |
| QZ01-117 | 97:3 | 150 | 195 | 5 | 350 | 158 | 110 | 268 |
| QZ01-133 | 97:3 | 150 | 195 | 5 | 350 | 184 | 135 | 319 |
| QZ01-146 | 97:3 | 150 | 195 | 5 | 350 | 174 | 110 | 284 |
| QZ01-118 | 100:0 | 150 | 200 | 0 | 350 | 163 | 100 | 263 |

**all of these samples have 0.1 g HBS

TABLE 2

Characterization of Coatings from EG/NMP Solvent Exchange Method
(Eleflex ™)

| | | Process Specifications | | | Chemistry Data | | Film properties | | | | |
|---|---|---|---|---|---|---|---|---|---|---|---|
| Batch # | Date | EG:NMP (v/v) | Duration of r × n* (min) | Additives | Solid Content (wt %) | Viscosity (cp) | # layers | Drying temp (° C.) | % Transmission | Thickness (nm) | Surface resistance (kΩ/sq) |
| QZ01-105 | Jan. 18, 2002 | 50:50 | 185 | 4-hydroxybenzene sulfonic acid (0.1 g) | 1.04 | 394 | 2 | 100 | 84.8 | 95 | 1.92 |
| QZ01-112 | Feb. 4, 2002 | 80:20 | 150 | polyethylene glycol (0.5 ml, 300 mw) | 1.11 | 461 | 1 | 100 | 86.7 | 50 | 2.70 |
| QZ01-113 | Feb. 5, 2002 | 20:80 | 355 | 4-hydroxybenzene sulfonic acid (0.1 g) | 1.20 | 41 | 3 | 100 | 87.2 | 105 | 3.83 |
| QZ01-116 | Feb. 11, 2002 | 50:50 | 210 | 4-hydroxybenzene sulfonic acid (0.1 g) | 1.27 | 81 | 3 | 100 | 85.5 | 105 | 2.55 |
| QZ01-117 | Feb. 11, 2002 | 97:3 | 210 | 4-hydroxybenzene sulfonic acid (0.1 g) | 1.21 | 314 | 1 | 100 | 87.4 | 50 | 2.74 |
| QZ01-118 | Feb. 12, 2002 | 100.0 | 200 | 4-hydroxybenzene sulfonic acid (0.1 g) | 1.07 | 277 | 1 | 100 | 87.0 | 75 | 2.52 |
| QZ01-119 | Feb. 13, 2002 | 80:20 | 195 | 4-hydroxybenzene sulfonic acid (0.1 g) | 1.16 | 302 | 1 | 100 | 87.8 | 50 | 2.24 |
| QZ01-120 | Feb. 14, 2002 | 95:5 | 200 | 4-hydroxybenzene sulfonic acid (0.1 g) | 1.16 | 287 | 1 | 100 | 87.7 | 50 | 2.80 |

The solvent exchange method is applicable to a broad concentration range of EG and NMP. The method disclosed herein is also applicable to a broad range of solvent mixtures wherein the resulting solvent exchanged product is used to produce a coating with a superior combination of electrical conductivity, optical transparency, adhesion to glass and plastic and environmental stability.

Example 8

Coating Data

The table below presents the test results for coatings derived from the EG/NMP (80%/20%) solvent exchanged method. The coatings were fabricated on PET substrate in one step. No pre- and/or post-substrate treatments were made.

| Test | Test Results |
|---|---|
| Surface Resistance (ohm/sq) | 1600–1800 |
| % Transmission (%) | 86.1–87.4 |
| Adhesion (Tape Tests) | >5 B |
| Pencil Hardness | >6 H |
| Haze (%) | 0.64–0.83 |

What is claimed is:

1. A method for replacing water in an aqueous dispersion of an optionally substituted polythiophene cation and associated anion with one or more organic solvents, comprising:
heating a mixture of an aqueous dispersion of an optionally substituted polythiophene cation and associated polyanion in a vessel with one or more organic solvents that include ethylene glycol, dimethylacetamide, N-methylpyrrolidone, or mixture thereof to vaporize at least 30% of the water from said mixture.

2. The method of claim 1, wherein the heating vaporizes greater than about 90% of the water from the mixture in said vessel.

3. The method of claim 1, wherein the heating vaporizes at least 95% of the water from the mixture said vessel.

4. The method of claim 1, wherein an inorganic additive is added during or at the end of the heating step.

5. The method of claim 1, wherein the one or more organic solvents is ethylene glycol by volume in the mixture from about 5% to about 95.

6. The method of claim 1, wherein the one or more organic solvents heated in the vessel to have a boiling point at a temperature of between from about 100° C. to about 250° C. at standard temperature and pressure.

7. The method of claim 1, wherein the mixture of one or more organic solvents and the aqueous dispersion are heated in the vessel at a pressure of from about 5.1 mm Hg to about 5171 mm Hg.

8. The method of claim 1, further including the step of contacting the heated organic solvents and the aqueous dispersion mixture with a flow of inert gas.

9. The method of claim 1, further comprises subjecting the polythiophene mixture to high sheer mixing sufficient to prevent or reduce agglomeration of the mixture.

10. The method of claim 1, wherein the optionally substituted polythiophene cation is represented by the following formula (I):

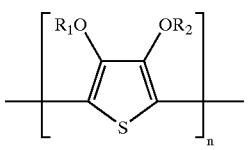

I wherein R1 and R2 each independently represent hydrogen or a C1–C6 alkyl group, or together form an optionally substituted C1–C6 radical or a cyclohexylene-1,2 radical, and n is greater than 1.

11. A method for replacing water in an aqueous dispersion of an optionally substituted polythiophene cation and associated anion with one or more organic solvents in a solvent exchange process comprising:
contacting in a vessel an amount of one or more organic solvents that include ethylene glycol, dimethylacetamide, N-methylpyrrolidone, or mixture thereof with an aqueous dispersion of an optionally substituted polythiophene cation and associated polyanion, said one or more organic solvents and aqueous dispersion heated in the vessel to a temperature sufficient to vaporize at least 30% of the water from said aqueous dispersion of the optionally substituted polythiophene cation and associated anion.

12. The method of claim 11, wherein the contacting step further comprises adding about 1 part of the aqueous dispersion to more than about 0.1 to about 10,000,000 parts of the one or more heated organic solvent per minute.

13. The method of claim 11, wherein the contacting removes greater than about 90% of the water from the aqueous dispersion in said vessel.

14. The method of claim 11, wherein the contacting removes greater than about 95% of the water from the aqueous dispersion in said vessel.

15. The method of claim 11, wherein the boiling point of at least one of the organic solvents is at least 100° C. at standard temperature and pressure (STP).

16. The method of claim 11, wherein the one or more organic solvents and the aqueous dispersion are heated in the vessel to a temperature of from between from about 100° C. to about 250° C.

17. The method of claim 11, wherein the one or more organic solvents and aqueous dispersion are heated at a pressure of from about 5.1 mm Hg to about 5171 mm Hg in the vessel.

18. The method of claim 11, wherein the contacting step further comprises subjecting the one or more organic solvents and aqueous dispersions to high sheer mixing sufficient to prevent or reduce agglomeration of the mixture.

19. The method of claim 11, wherein at least one of the solvents is water soluble.

20. The method of claim 11, wherein at least one of the solvents is partially soluble or insoluble in water.

21. The method of claim 11, wherein the one or more organic solvents includes ethylene glycol by volume in the mixture from about 5% to about 95%.

22. The method of claim 11, wherein the one or more organic solvents is a mixture of ethylene glycol and N-methylpyrrolidone (NMP).

23. The method of claim 11, wherein the one or more organic solvents is a mixture of ethylene glycol and NMP in a ratio of 80:20 (v/v).

24. The method of claim 11, wherein an inorganic additive is added to the vessel.

25. The method of claim 24, wherein the organic additive is 4-hydroxybenzene sulfonic acid.

26. The method of claim 11, wherein between from about at least 30% (w/v) to about at least 99% (w/v) of the water is removed from the mixture as vapor.

27. The method of claim 11, further including the step of contacting the heated solvent and aqueous dispersion with an inert gas.

28. The method of claim 11, wherein the polythiophene cation is represented by the following formula (I):

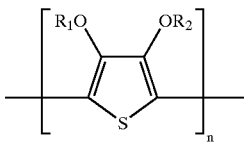

wherein R1 and R2 each independently represent hydrogen or a C1–C6 alkyl group, or together form an optionally substituted C1–C6 radical or a cyclohexylene-1,2 radical, and n is greater than 1.

29. The method of claim 28, wherein the C1–C6 radical is an ethylene 1,2 radical.

30. The method of claim 28, wherein n is greater than 1.

31. The method of claim 28, wherein n is from about 5 to about 5000.

32. The method of claim 11, wherein the polyanion is polystyrene sulfonic acid (PSS).

33. The method of claim 11, wherein the polythiophene is an aqueous dispersion of about 0.5 to about 5% by weight poly-3,4-ethylene dioxythiophene.

34. The method of claim 11, further including an additive in said vessel that is a binder.

35. The method of claim 11, further including an additive in said vessel that is a wetting agent.

36. The method of claim 11, further including an additive in said vessel that is an adhesion promoter.

37. A method for exchanging water in an aqueous dispersion of a poly 3,4-ethylene dioxythiophene cation and associated polystyrene sulfonic acid polyanion with a solvent mixture comprising;

contacting a solvent mixture containing any two or all three of ethylene glycol, N-methylpyrrolidinone, and/or N,N-dimethylacetamide, heated in a vessel to a temperature of between about 100° C. to about 250° C. with an amount of the aqueous dispersion in the vessel to form an exchange mixture; the contact at a rate sufficient to remove at least part of the water from the aqueous dispersion as vapor; and heating said exchange mixture to further remove water from the exchange mixture.

38. The method of claim 37, wherein the the rate is between from about 0.1 to about 1000 mL/minute.

39. The method of claim 38, wherein the vapor is removed from the heated exchange mixture in said vessel with a flow of an inert gas.

40. The method of claim 37, wherein the water removal from the vessel is facilitated by an azeotroping agent.

41. The method of claim 37, wherein from about 30% (w/v) to 99% (w/v) of the water is removed from the exchange mixture.

42. The method of claim 37, wherein the solvent mixture includes from about 5% to about 95% ethylene glycol by volume.

43. The method of claim 37, wherein the solvent mixture is ethylene glycol and NMP in a ratio of 80:20 (v/v).

44. The method of claim 37, wherein the conditions further comprise exposing the solvent mixture to a pressure from about 5.1 mm Hg to about 5171 mm Hg in the vessel.

45. The method of claim 37, further comprises subjecting the exchange mixture to high sheer mixing.

46. The method of claim 37, wherein the aqueous dispersion contains at least one additive.

47. The method of claim 46, wherein the additive is a binder.

48. The method of claim 46, wherein the additive is a wetting agent.

49. The method of claim 46, wherein the additive is an adhesion promoter.

* * * * *